Patented Dec. 11, 1951

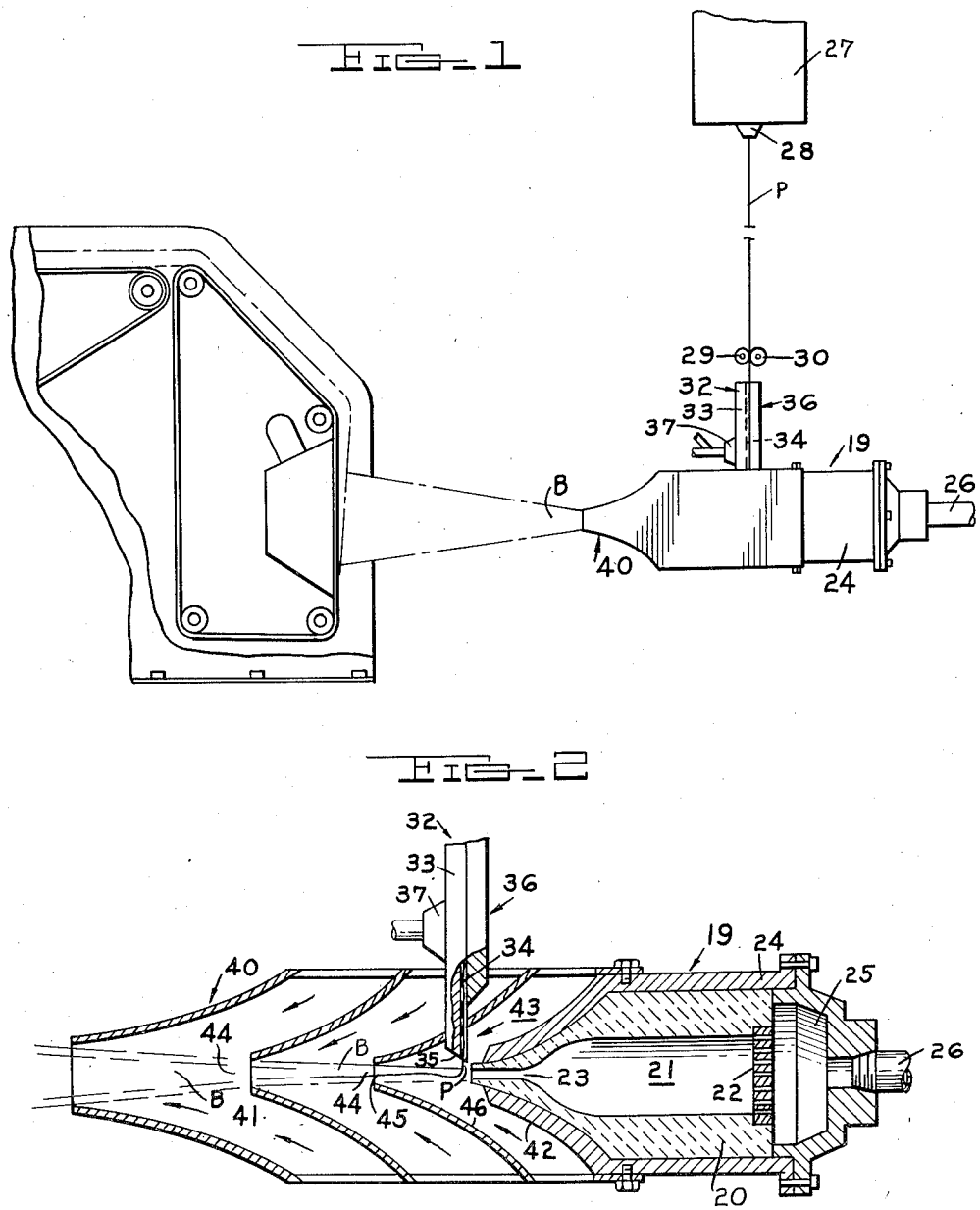

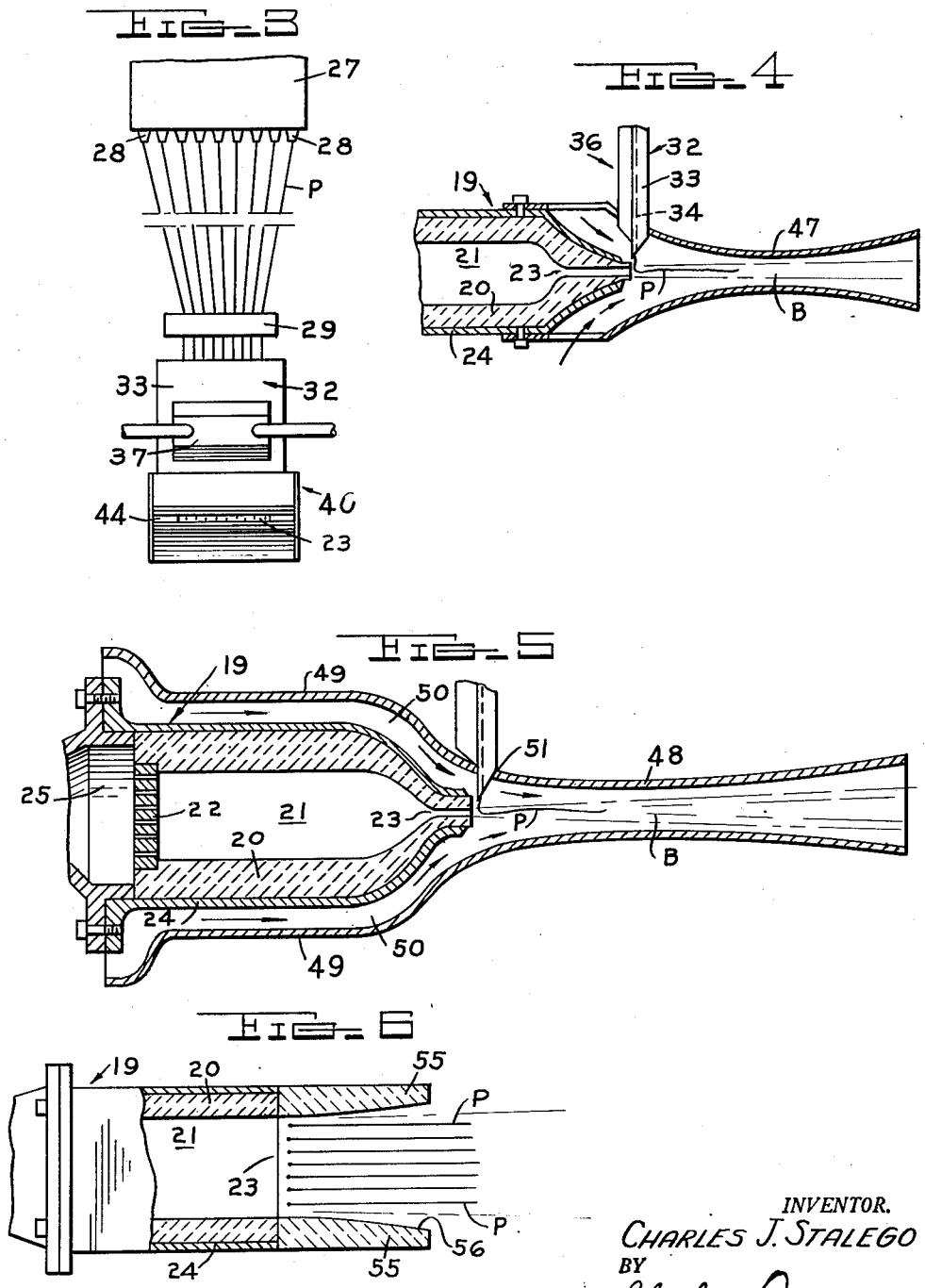

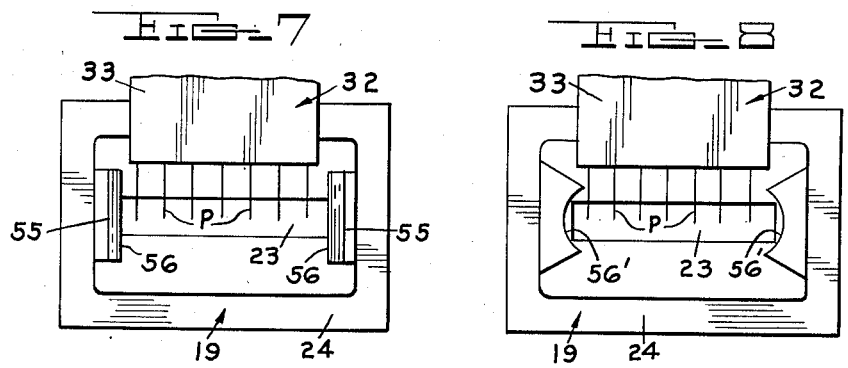
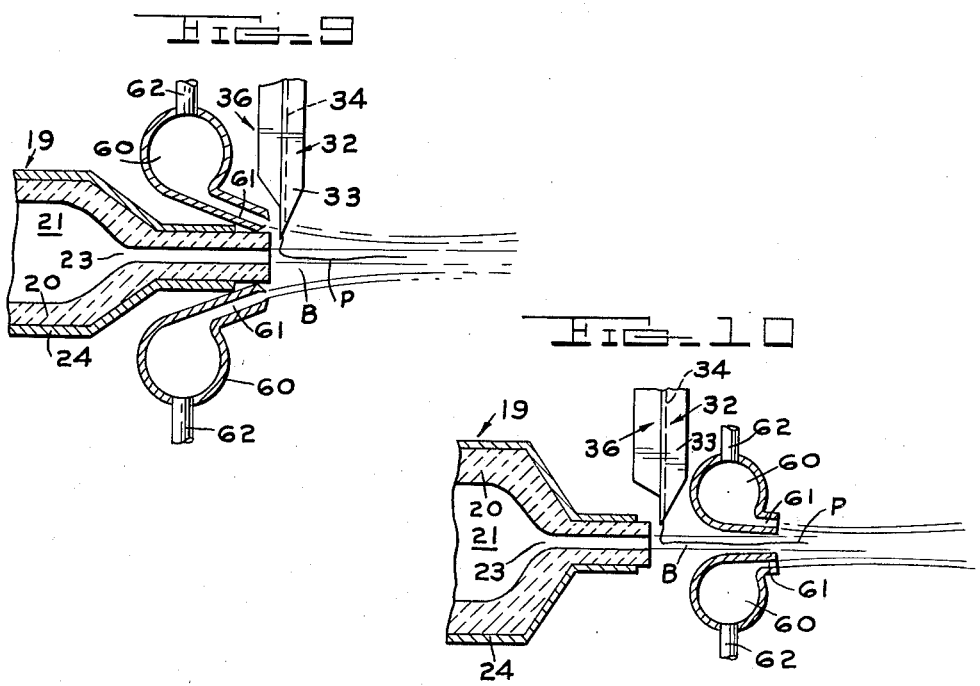
INVENTOR.
CHARLES J. STALEGO
BY
ATTORNEYS

2,578,101

UNITED STATES PATENT OFFICE

2,578,101

APPARATUS FOR PRODUCING FIBERS FROM GLASS AND OTHER HEAT SOFTENABLE MATERIALS

Charles J. Stalego, Newark, Ohio, assignor to Owens-Corning Fiberglas Corporation, a corporation of Delaware Application October 15, 1947, Serial No. 780,074

14 Claims. (Cl. 18—2.5)

This invention relates to apparatus for producing fibers from heat softenable materials, such for example, as glass.

The present invention concerns itself more particularly with apparatus for making fibers wherein the heat softenable material or glass is drawn out or attenuated into fine fibers by a gaseous blast produced by burning a combustible gaseous mixture in a chamber and discharging the products of combustion through an opening in one wall of the chamber. The opening is ordinarily elongated in a direction extending transversely of the chamber and is so proportioned with respect to the combustion chamber that the products of combustion passing through the opening form a ribbon-like blast having a temperature exceeding the softening temperature of the glass and having a velocity sufficiently high to draw-out or attenuate the softened glass into fibers.

Glass rods may be fed into the blast along a path extending transversely of the blast with the rods spaced laterally from each other across the width of the blast. The characteristics of the blast, the size of the rods and the rate of feed of the rods into the blast are such that the glass at the advancing ends of the rods is melted or softened sufficiently in the blast to enable the force of the blast to draw-out or attenuate the softening glass into fine fibers.

Inasmuch as the blast is usually discharged from the burner directly into the atmosphere, the temperature and velocity of the blast decreases as the distance from the burner increases. In other words, the length of the attenuating zone in the blast is somewhat restricted. The length of this zone in the blast, over which the required attenuating temepratures and velocities are maintained, is one of the important factors in controlling the commercial production of fine fibers of one micron or less in diameter or in controlling the production of coarser fibers from larger diameter rods.

With the above in view, it is one of the objects of this invention to substantially increase the length of the zone in the blast over which attenuating temperatures and velocities are maintained. In general this is accomplished herein by shielding the gaseous blast issuing from the burner outlet opening for a substantial portion of its length. Thus unlimited expansion of the gaseous blast issuing from the burner outlet opening is resisted and the blast is protected from the cooling effects of the surrounding atmosphere.

Another object of this invention is to minimize loss of heat from the blast. Streams of fluid are directed along the blast in the general direction of flow of the blast. This fluid may be air induced to flow from the atmosphere and along the blast by the movement of the blast or may be in the form of a gaseous medium discharged against the blast under sufficient pressure to result in a movement of the gaseous medium along the blast at a rate tending to approach the speed of the blast. In either case the fluid provides a protective shield for the blast to reduce heat losses and, in addition, imparts a movement to the atmosphere adjacent the burner outlet opening in the direction of flow of the blast issuing from this opening. This latter feature is important as it reduces the resistance ordinarily offered by the atmosphere to the projection of the blast into the atmosphere, and as a consequence, reduces the turbulence resulting from such interference. Although a certain amount of turbulence assists in the production of very fine fibers, it is desirable to prevent this turbulence from becoming so violent that the fine fibers are broken up into very short lengths and the above arrangement of shielding tends to prevent such a condition.

Still another object of this invention is to provide a shield supported with one end positioned to receive the blast issuing from the burner discharge orifice and having means cooperating with the burner walls to form a passage through which air induced by movement of the blast flows into the shield along the blast. Thus the induced air is heated by radiation from the burner walls and heat losses from the blast are further reduced.

A further object of this invention is to provide controlled expansion of the blast and to accelerate the flow of induced air along the blast.

A still further object of this invention is to minimize the tendency of the blast to "neck-in" or reduce in width as it issues from the burner orifice. Thus the effective width of the gaseous blast at some distance from the burner approximates the actual length of the elongated burner outlet opening and, as a consequence, a greater number of primary filaments or rods of heat softenable material may be fed into the blast produced through an orifice of given length. In other words, it is not necessary to increase the length of the burner orifice opening to compensate for the tendency of the blast to "neck-in" as it leaves the burner. This is especially important in the present instance where the relative proportions of the burner orifice and combustion chamber in the burner are important in obtaining a blast of the required temperature and velocity for efficient attenuation of the glass or heat softenable material.

The foregoing as well as other objects will be made more apparent as this description proceeds, especially when considered in connection with the accompanying drawings, wherein:

Figure 1 is a semi-diagrammatic elevational view partly in section of one type of apparatus capable of producing fibers in accordance with this invention;

Figure 2 is a longitudinal sectional view through the burner and primary filament guide assembly shown in Figure 1;

Figure 3 is a front elevational view of a part of the apparatus shown in Figure 1;

Figure 4 is a fragmentary longitudinal sectional view showing a modified construction;

Figure 5 is a fragmentary longitudinal sectional view of another embodiment of this invention;

Figure 6 is a plan view partly in section of still another modification;

Figure 7 is a front elevational view of the construction shown in Figure 6;

Figure 8 is a view similar to Figure 7 showing a further embodiment of this invention;

Figure 9 is a fragmentary longitudinal sectional view of another form of burner assembly that may be used in practicing this invention; and Figure 10 is a view similar to Figure 9 showing a still further modification of the invention.

The process for producing fibers in accordance with this invention from heat softenable or thermoplastic materials such, for example, as glass, will be more fully understood upon considering the apparatus selected herein for carrying out the several steps of the process.

Referring first to the embodiment of the invention shown in Figures 1 to 3 inclusive, it will be noted that the numeral 19 designates a combustion type burner having a body 20 of refractory material shaped to define a combustion chamber 21. The rear end of the combustion chamber 21 is provided with a wall 22 having a plurality of restricted orifices extending therethrough, and the opposite end of the chamber is provided with a front wall having an outlet or discharge opening 23 therethrough. The refractory body 20 is enclosed in a sheet metal shell 24 which extends beyond the rear end of the body in a manner to form an inlet chamber or manifold 25 at the rear side of the perforated wall 22. A suitable conduit 26 is connected at one end to the rear end of the shell for feeding the specified combustible gaseous mixture into the inlet chamber 25.

The type of combustible gas used may be of any suitable kind, but for reasons of economy, it is preferred to use an ordinary fuel gas, such as natural or manufactured fuel gas. This gas is mixed with the proper amount of air by means of the conventional type of air and gas mixer not shown herein. The gas and air mixture is taken from the mixer at moderate pressures of approximately 1 to 5 p. s. i., or considerably more if desired, and is led through the conduit 26 to the inlet chamber 25 of the burner.

The selected gaseous mixture admitted to the inlet chamber 25 passes through the orifices in the wall 22 where it ignites and burns with a resulting high degree of expansion. During operation the walls of the combustion chamber 21 are heated by the burning gas and the hot walls tend to increase the rate at which the gas entering the chamber burns. The resulting high rate of combustion causes a great expansion of the products of combustion which escape from the chamber 21 into the atmosphere through the outlet opening 23. As will be presently described, the outlet opening 23 is restricted to greatly accelerate the escape of the products of combustion from the chamber and thereby provides a very high velocity gaseous blast B of intense heat. Generally speaking, it is preferred to feed as much gaseous mixture into the chamber 21 as possible, without causing the combustion in the chamber to become unstable or to take place at the outside of the chamber, or to cease altogether.

The outlet opening 23 is elongated in a direction extending transversely of the combustion chamber 21, and the cross-sectional area of the outlet opening is so proportioned with respect to the cross-sectional area of the chamber that the products of the combustion taking place within the chamber are greatly accelerated as they pass through the outlet opening. As will be more fully hereinafter described, the cross-sectional area of the opening 23 may be varied to some extent relative to the cross-sectional area of the chamber 21, depending upon the heat required in the blast B issuing from the outlet opening.

In this connection it will be noted that as the cross-sectional area of the outlet opening 23 is increased in relation to the cross-sectional area of the combustion chamber 21, the temperature of the gaseous blast B is also increased, and the velocity of the blast passing through the outlet is decreased. Preferably the cross-sectional area of the outlet opening 23 is no greater than necessary to obtain in the blast the heat required to raise the material or glass to the proper attenuating temperature. The most efficient relationship between the cross-sectional area of the outlet opening 23 and the corresponding area of the chamber 21 may be readily determined by simple trial, but in most instances, will be found to be within the range of 1:8 to 1:4. This arrangement provides for obtaining a gaseous blast having sufficient temperature to soften or melt the glass to the proper degree for effective attenuation by the available velocity of the blast. In actual practice, temperatures in the blast of 3000° F. or more are obtainable, and velocities of 1250 or more feet per second have been secured.

The glass or other heat softenable material selected is fed into the blast B in the form of primary filaments or solid rods P. As indicated in Figure 3 of the drawings, a plurality of primary filaments are fed into the blast B along a path extending substantially perpendicular to the blast and are arranged with adjacent filaments spaced laterally from each other crosswise of the blast. Referring again to Figure 1 of the drawings, it will be noted that the reference character 27 indicates a glass feeder or bushing which may be in the form of a long relatively narrow trough having a plurality of orifices 28 in the bottom wall thereof.

Glass cullet or glass batch is fed to the bushing in any suitable manner, and is heated while in the bushing to a molten condition. The molten glass flows from the orifices 28 in the form of small streams, which are attenuated to form the primary filaments P by means of coacting feed rolls 29 and 30 located below the bushing 27 a sufficient distance to assure cooling of the streams to solidification before engagement by the rolls. One or both of the feed rolls may be driven by any suitable type of prime mover, such for example, as an electric motor not shown herein.

It has been found that the velocity and temperature of the blast is highest immediately adjacent the outlet opening 23 in the front wall of the burner and decreases in both temperature and velocity as the distance from the outlet opening increases. Thus in order to take full advantage of the maximum temperature and velocity of the blast, the primary filaments P are fed into the blast as close to the outlet opening 23 as is practical.

In accordance with this invention the primary filaments P are guided into the blast by a guide 32 suitably supported between the coacting feed rolls and the blast B. The guide 32 comprises a plate 33 elongated in the direction of the path of travel of the primary fibers P leaving the feed rolls and having a plurality of laterally spaced grooves 34 corresponding in number to the number of primary filaments. The lateral spacing of the grooves 34 is such that these grooves respectively receive the primary filaments as the latter leave the feed rolls, and the grooves preferably extend for the full length of the plate 33. The lower end portion 35 of the guide plate 33 extends downwardly in juxtaposition to the front wall of the burner and terminates as closely as possible to the top side of the blast B issuing from the burner outlet opening 23.

The guide 32 is provided with a cover 36 which is secured to the rear face of the plate 33 over the grooves 35 to enclose the primary filaments P. The lower end of the cover 36 terminates short of the portion 35 of the plate 33 to expose the primary filaments to heat radiating from the front wall of the burner. Due to the fact that the guide plate 33 extends in close proximity to the blast B, this plate is subjected to extremely high temperatures, and if desired, may be cooled by providing a jacket 37 at the front side of the plate 33. A cooling medium from any suitable source may be circulated through the jacket 37 in accordance with orthodox practice.

It has been pointed out above that both the temperature and velocity of the gaseous blast decreases as the distance from the burner discharge opening 23 increases. For the purpose of this description, the zone or length of the blast having a temperature sufficiently high to maintain the glass at the viscosity required to enable attenuating the glass to secondary fibers of the proper size will be considered the effective attenuating length or zone of the blast. Under ordinary conditions of operation, this zone is somewhat restricted in length due to the great expansion of the gaseous blast as it is discharged into the atmosphere from the burner outlet opening, and due to the loss of heat from the blast to the atmosphere.

It will further be noted that under ordinary conditions, the atmosphere at the discharge side of the outlet opening 23 is relatively stationary, so that as the blast is discharged into the atmosphere, considerable turbulence is created. While a certain amount of turbulence is desired in that it tends to impart an undulating motion to the fibers being drawn, and thereby greatly assists in the attenuation of these fibers, nevertheless, uncontrolled turbulence is objectionable, especially where it is desired to produce as long a fiber as possible. Uncontrolled or severe turbulence in the attenuating zone may result in blowing the fibers out of the boundary of the attenuating zone, and in any case, has a tendency to break up the fine fibers into small lengths.

In actual practice it is ordinarily desirable to increase the effective attenuating length of the blast B as much as possible, so that the glass streams in the blast are maintained in a molten or softened condition for a greater portion of their length, and as a result, are more effectively drawn out or attenuated by the force of the blast. Thus finer fibers may be produced at greater quantities from primary filaments of larger diameter.

In accordance with this invention the effective length of the attenuating zone is substantially increased by shielding the blast B as it issues from the outlet opening 23 in the burner. With this in view, reference is made more in detail to Figure 2 of the drawings, wherein the reference numeral 40 designates a shield which may be formed of a refractory metal, but is preferably formed of a metal having extremely high heat resisting characteristics, such for example, as inconel, platinum, nickel or chromium. In any case the shield is generally tubular in cross-section having a passage 41 therethrough corresponding in shape to, but somewhat greater in size than, the outlet opening 23 in the front wall of the burner.

The shield 40 is suitably supported at the front side of the burner 19 with the rear end registering with the outlet opening 23 in the front wall of the burner 19, so that the blast B discharged from the outlet opening enters the rear end of the passage 41 and flows through the shield 40. The top and bottom walls of the shield 40 at the rear end of the latter are flared outwardly, and the front wall portions 42 of the burner at opposite sides of the outlet opening 23 are correspondingly flared to form passages 43. The passages 43 communicate with the atmosphere in the region of the burner 19 and direct air from the atmosphere into the shield 40. This air is induced by the movement of the blast B through the shield and, of course, passes over the burner walls so as to be heated by radiation from the latter. If desired, additional openings 44 may be formed in opposite sides of the shield in spaced relation to each other lengthwise of the shield from the passages 43, and the walls of the shield adjacent the openings 44 may be flared outwardly to provide additional passages for air. Thus air from the atmosphere may flow relatively freely into the shield along opposite sides of the blast in the direction of movement of the blast.

The depth of the passage 41 at the rear end of the shield or, in other words, at the zone 45, is preferably restricted to impart a Venturi-shaped contour to the passage and thereby accelerate the flow of induced air through the shield in the direction of movement of the blast. The top wall of the shield adjacent the rear end thereof is formed with a slot 46 elongated transversely of the shield and positioned to receive the filaments P as the latter leave the guide 32.

It follows from the foregoing that the blast B is confined to some extent by the shield, and the induced air flowing along the blast. This arrangement prevents any tendency for the blast to break up as it is discharged into the atmosphere, and thereby greatly increases the effective length of the attenuating zone. Also the induced air passing through the shield protects the blast from the cooling effects of the surrounding atmosphere and minimizes loss of heat from the blast, so that the temperature of the blast in the attenuating zone may be more nearly uniform throughout the length of this zone. Moreover, the induced air admitted to the shield results in a movement of the atmosphere immediately adjacent the discharge opening 23 in the direction of flow of the blast, so that turbulence in the attenuating zone of the blast is somewhat reduced or controlled.

The flow of air through the shield has a cooling effect on the shield, and in most instances, will be sufficient to prevent the shield from reaching critical temperatures without the necessity of employing artificial cooling means. However, such means may be provided if necessary.

Referring now to the embodiment of the invention shown in Figure 4 of the drawings, it will be noted that the shield 47 is in the form of a tube similar to the shield 40, except that the openings 44 are omitted, and the air induced by the movement of the blast through the tube is required to enter the tube through the rear end of the latter. It will also be noted that in this embodiment the tube is suitably supported with the rear end in advance of the primary filament guide 32, eliminating the necessity of slotting the shield to receive the primary filament.

The modification shown in Figure 5 of the drawing discloses a tubular shield 48 similar to the shield 47, except that the shield 48 is formed with an extension 49 at the rear end of sufficient size to substantially enclose the burner 19. The extension 49 is of greater dimension than the burner, and cooperates with the walls of the latter to form a passage 50 through which practically all of the air, induced by movement of the blast through the shield, is required to pass. Thus this air is heated substantially before contact with the blast and loss of heat from the blast to the induced air is thereby minimized. It will further be noted that the top wall of the shield opposite the filament guide 32 is formed with an elongated slot 51 through which the primary filaments P may pass into the blast.

Another characteristic of blasts produced without the assistance of a shield is that as the blast issues from the burner outlet opening 23, it tends to "neck-in" or reduce in width to some extent. This is objectionable, especially in cases where it is desired to feed the primary filaments P into the blast immediately adjacent the discharge side of the outlet opening 23, and ordinarily necessitates either reducing the number of primary filaments projected into the blast, or requires the length of the outlet opening 23 to be increased by an amount required to compensate for the extent of restriction of the blast.

In order to overcome the above objection, a pair of plates 55 are supported at opposite ends of the burner outlet opening 23 in the manner shown in Figures 6 and 7. These plates are preferably formed of a high heat resisting refractory material, and are positioned so that the inner surfaces 56 form, in effect, continuations of the opposite end walls of the outlet opening 23.

As the products of combustion are discharged from the outlet opening 23, they tend to follow the inner surfaces 56 on the plates 55, and by reason of this phenomena, the tendency for the gaseous blast to "neck-in" is greatly reduced. Consequently, the width of the blast discharged from the opening 23 between the plates will correspond substantially to the full length of the outlet opening 23 and by feeding the primary filaments into the blast between the plates, advantage may be taken of the full width of the blast. In fact, the plates 55 actually extend forwardly beyond the zone of introduction of the primary filaments into the blast, so as to exercise some control on the expansion of the blast and thereby tend to increase the effective length of the attenuating zone.

It is pointed out in this connection that the opposite side walls of the shields previously described assume positions adjacent opposite ends of the elongated burner discharge opening 23, and as a consequence, have somewhat the same effect on the blast as the plates 55.

In Figure 8 of the drawing a construction similar to the one shown in Figure 6 is illustrated, except that the inner surfaces 56' of the plates 55 are transversely curved in a laterally outward direction. Such a construction is desirable in that it has a tendency to confine opposite edge portions of the blast, or in other words, limits spreading of the edge portions of the blast passing along the plates.

In the modification shown in Figure 9 of the drawings, the blast issuing from the burner discharge opening 23 is somewhat confined without the use of metal or similar shields. In detail, a pair of blowers 60 are respectively supported at opposite sides of the opening 23 in positions such that the discharge sides 61 of the blowers are directed toward opposite sides of the blast B issuing from the burner outlet opening. Fluid such as air or steam is admitted to the blowers through inlet conduits 62, and this fluid is discharged from the blowers at a rate approximating the velocity of the gaseous blast flowing from the burner discharge opening 23. The resulting relatively high velocity streams of fluid flowing along opposite sides of the path of travel of the blast not only protects the blast from the cooling effects of the atmosphere, but in addition, tends to control expansion of the blast as well as the turbulence resulting from discharging the blast into the atmosphere.

In the present instance the primary filaments P are introduced to the blast in advance of the blowers. However, if desired, the blowers may be located in advance of the primary filament guide 32 in the manner clearly indicated in Figure 10 of the drawings. In either case the effective length of the attenuating zone in the blast is substantially increased, and the turbulence in this zone is somewhat reduced.

Although a number of embodiments of this invention are shown herein for the purpose of illustration, nevertheless, it will be noted that in each embodiment provision is made for shielding or confining the blast for a substantial portion of its length. In certain modifications the shielding is accomplished by the cooperation of a metal tube and air induced by movement of the blast through the shield, and in other instances, the blast is shielded by relatively fast moving streams of fluid. Regardless of the specific arrangement selected, the blast is protected for a substantial portion of its length from the cooling effects of the atmosphere, and the turbulence in the attenuating zone of the blast is controlled. As a result it is possible to produce fine fibers of substantial length on an economical production basis.

I claim:

1. Apparatus for producing fibers from a heat softenable material, comprising a burner having a chamber in which a combustible fuel and air mixture is ignited and having a restricted opening through which the products of combustion are discharged in the form of a high temperature blast moving at substantial velocity, an elongated shield enclosing the blast for a substantial part of its length and open at opposite ends to enable the blast and air induced by the movement of the blast to flow through the shield, at least two opposing sides of the shield being inclined toward and along the blast, and means for feeding a body of heat softenable material into the blast to be attenuated in the blast.

2. Apparatus for producing mineral fibers, comprising a burner having a chamber in which a combustible fuel and air mixture is ignited and having a restricted outlet opening through which the products of combustion are discharged in the form of a high velocity blast having a temperature exceeding the softening temperature of glass, means for confining the blast throughout a substantial portion of its length including a shield supported with one end positioned to receive the blast issuing from the outlet opening and at said end enclosing at least a part of said burner in spaced relation with the burner walls to form a passage through which air induced by movement of the blast is heated by contact with the burner as it is drawn into the shield, and means for feeding a body of glass into the blast at a point adjacent the burner outlet opening.

3. Apparatus for producing fibers from a heat softenable material, comprising a burner having walls cooperating to form a chamber in which a combustible gaseous mixture is ignited and having an opening through the front wall elongated in a direction extending transversely of the chamber to provide a discharge slot through which the products of combustion are discharged in the form of a hot high velocity blast, means for increasing the width of the blast issuing from the outlet opening and reducing the turbulence therein including a shield having portions extending along opposite sides of the blast, said shield having an opening adjacent the burner and being curved inwardly and forwardly along the blast to provide a smooth passage for air entering the opening in the shield induced by movement of the blast, and means for feeding heat softenable material into the blast.

4. Apparatus for producing glass fibers comprising, a burner having a chamber in which a combustible gaseous mixture is ignited and having a restricted outlet opening through which the products of combustion are discharged in the form of a high velocity blast having a temperature exceeding the softening temperature of the glass and having a normal tendency to reduce in width as it leaves the outlet opening, means for increasing the width of the blast issuing from the outlet opening including a shield having portions extending along opposite sides of the blast, said shield having an air inlet and being formed with portions curving inwardly and forwardly along the blast to provide a smooth passage for air induced by the flow of the blast entering the inlet, and means for feeding an elongated body of glass into the blast within the shield.

5. Apparatus for producing glass fibers comprising, a burner having a combustion chamber within which a combustible gaseous mixture is ignited and having an opening elongated in a direction extending transversely of the burner to provide a reduced slot through which the products of combustion are discharged in a ribbon-like blast having a natural tendency to reduce in width as it leaves the slot, means for increasing the width of the blast issuing from the burner outlet opening including an elongated Venturi-shaped tube having a cross-section corresponding generally to the shape of the outlet opening and supported with one end positioned to receive the blast issuing from the burner outlet opening, and means for feeding an elongated body of glass into the blast adjacent the entrant end of the tube.

6. Apparatus for producing glass fibers comprising, a burner having a combustion chamber within which a combustible gaseous mixture is ignited and having an opening elongated in a direction extending transversely of the burner to provide a reduced slot through which the products of combustion are discharged in a ribbon-like blast, means for extending the length of the blast issuing from the burner outlet opening and reducing the turbulence therein including an elongated Venturi-shaped tube having a cross-section corresponding generally to the shape of the outlet opening and supported with one end positioned to receive the blast issuing from the burner outlet opening, means at the entrant end of the tube cooperating with the walls of the burner to provide a passage through which air induced by movement of the blast enters the tube, and means for introducing glass into the blast.

7. Apparatus for producing glass fibers comprising, a burner having a combustion chamber within which a combustible gaseous mixture is ignited and having an opening in one wall elongated to provide a reduced slot through which the products of combustion are discharged in the form of a hot high velocity ribbon-like blast having a normal tendency to reduce in width outwardly of the slot, a shield of heat resistant material having portions extending in the direction of flow of the blast from opposite ends of the slot to maintain the width of the blast leaving the slot, and means for introducing glass rods into the blast in a zone between the portions aforesaid of the shield.

8. Apparatus for producing glass fibers comprising, a burner having a combustion chamber within which a combustible gaseous mixture is ignited and having an opening in one wall elongated to provide a reduced slot through which the products of combustion are discharged in the form of a hot high velocity ribbon-like blast, a shield of heat resistant material including walls adjacent the ends of the slot and having vanes extending between the walls and in the direction of flow of the blast and having the inner surfaces of said vanes transversely curved in a laterally outward direction with respect to the path of flow of the blast, and means for feeding glass into the blast in a zone between the vanes aforesaid of the shield.

9. Apparatus for attenuating heat softenable material into fibers comprising means for establishing a blast of gas moving at a velocity sufficient to attenuate the heat softened material and being at a temperature sufficient to heat the material to attenuating temperature, a shield enclosing the blast for at least a part of its length and open at opposite ends to enable the blast and air induced by the blast to flow through the shield, parts of the side walls of the shield being inclined toward and along the blast to guide induced air into the blast, and means for feeding a body of heat softenable material into the blast to be attenuated.

10. Apparatus for attenuating glass into fibers comprising means for discharging into the atmosphere a blast of gas moving at a velocity sufficient to attenuate the glass and being at a temperature sufficient to heat the glass to attenuating temperature, a shield enclosing the blast for a substantial part of its length and open at opposite ends to enable the blast and air induced by the blast to flow through the shield, parts of the side walls of the shield being inclined toward and along the blast to guide induced air into the blast, and means for feeding a body of glass into the blast to be attenuated.

11. Apparatus for attenuating heat softenable material into fibers comprising means for discharging into the atmosphere a blast of gas moving at a velocity sufficient to attenuate the heat softened material and being at a temperature sufficient to heat the material to attenuating temperature, a shield enclosing the blast for a substantial part of its length and open at opposite ends to enable the blast and air induced by the blast to flow through the shield, said shield being of substantially Venturi-shape to aid in increasing the effective length of the blast, and means for feeding a body of heat softenable material into the blast to be attenuated.

12. Apparatus for attenuating mineral material into fibers comprising means for establishing a blast of gas moving at a velocity sufficient to attenuate the mineral material and being at a temperature sufficient to heat the mineral material to attenuating temperature, a shield enclosing the blast for a substantial part of its length and open at opposite ends to enable the blast and air induced by the blast to flow through the shield, said shield comprising a plurality of vanes arranged in pairs with the vanes of each pair disposed at opposite sides of the path of the blast and inclined inwardly and forwardly with respect to the direction of movement of the blast, and means for feeding mineral material into the blast to be attenuated.

13. Apparatus for attenuating mineral material into fibers comprising means for establishing a blast of gas moving at a velocity sufficient to attenuate the mineral material and being at a temperature sufficient to heat the mineral material to attenuating temperature, a shield enclosing the blast for a substantial part of its length and open at opposite ends to enable the blast and air induced by the blast to flow through the shield, said shield comprising a plurality of vanes arranged in pairs with the vanes of each pair disposed at opposite sides of the blast and with the pairs of vanes spaced apart lengthwise of the blast, the vanes being curved inwardly and forwardly with respect to the blast, and means for feeding a body of mineral material into the blast to be attenuated.

14. Apparatus for attenuating glass into fibers comprising means for discharging a blast of gas into the atmosphere moving at a velocity sufficient to attenuate the glass and being at a temperature sufficient to heat the glass to attenuating temperature, a shield enclosing the blast for a substantial part of its length and open at opposite ends to enable the blast and air induced by the blast to flow through the shield, said shield comprising a plurality of vanes arranged in pairs with the vanes of each pair disposed at opposite sides of the blast and with the pairs of vanes spaced apart lengthwise of the blast, the vanes being inclined inwardly and forwardly with respect to the blast and following a curve that approaches tangential relation with the blast, and means for feeding a body of glass into the blast to be attenuated.

CHARLES J. STALEGO.

REFERENCES CITED

The following references are of record in the file of this patent:

UNITED STATES PATENTS

| Number | Name | Date |
| --- | --- | --- |
| 1,128,175 | Morf | Feb. 9, 1915 |
| 1,157,984 | Herkenrath | Oct. 26, 1915 |
| 1,769,181 | Jackson | July 1, 1930 |
| 2,175,225 | Slayter | Oct. 10, 1939 |
| 2,402,441 | Paddle | June 18, 1946 |
| 2,450,363 | Slayter et al. | Sept. 28, 1948 |
| 2,455,908 | Slayter | Dec. 7, 1948 |
| 2,499,218 | Hess | Feb. 28, 1950 |